United States Patent [19]

Hudock

[11] Patent Number: 4,623,559
[45] Date of Patent: Nov. 18, 1986

[54] U.V. CURED FLEXIBLE POLYESTER-MONOACRYLATE PROTECTIVE THERMISTOR COATINGS HAVING GOOD EDGE COVERAGE AND METHOD OF COATING

[75] Inventor: John S. Hudock, Hempfield Township, Westmoreland County, Pa.

[73] Assignee: Westinghouse Electric Corp., Pittsburgh, Pa.

[21] Appl. No.: 755,134

[22] Filed: Jul. 12, 1985

[51] Int. Cl.⁴ .............................................. B05D 3/06
[52] U.S. Cl. ................................... 427/54.1; 427/96; 427/101; 427/240; 427/346; 427/430.1
[58] Field of Search ............... 427/54.1, 96, 240, 101, 427/346, 430.1; 204/159.15

[56] References Cited

U.S. PATENT DOCUMENTS

| | | | |
|---|---|---|---|
| 3,820,239 | 6/1974 | Nagata | 29/612 |
| 3,839,783 | 10/1974 | Dankert | 29/588 |
| 4,154,896 | 5/1979 | Sattler et al. | 428/458 |
| 4,282,269 | 8/1981 | Lucey | 427/54.1 |
| 4,304,879 | 12/1981 | Ehrhart et al. | 525/35 |
| 4,336,311 | 6/1982 | Lucey | 428/521 |
| 4,425,287 | 1/1984 | Hesse et al. | 204/159.15 X |
| 4,492,718 | 1/1985 | Mayer et al. | 427/240 |

Primary Examiner—Thurman K. Page
Attorney, Agent, or Firm—Daniel P. Cillo

[57] ABSTRACT

A method of coating an electronic component comprises applying a U.V. curable liquid resin containing a photoinitiator, rotating the coated component from its coating position, and passing the rotated component next to a source of U.V. radiation.

8 Claims, 2 Drawing Figures

U.S. Patent  Nov. 18, 1986  4,623,559
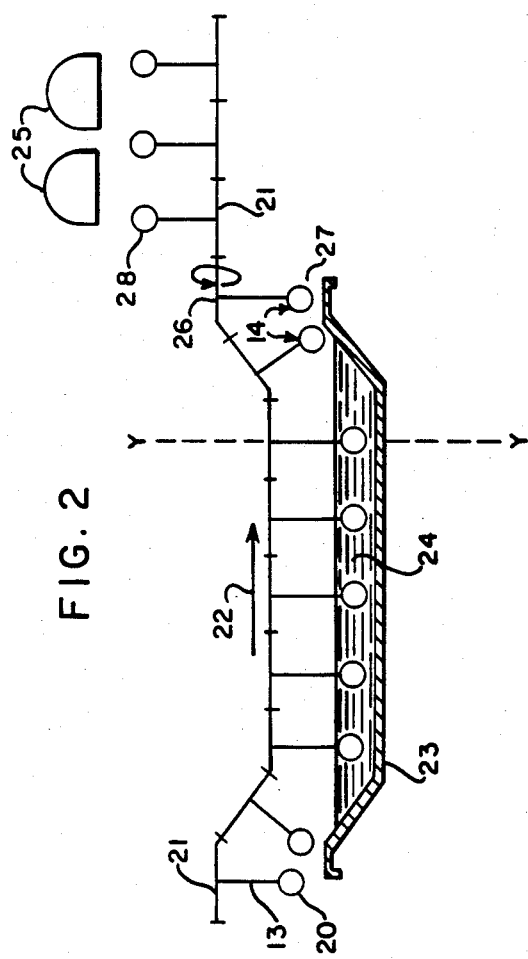
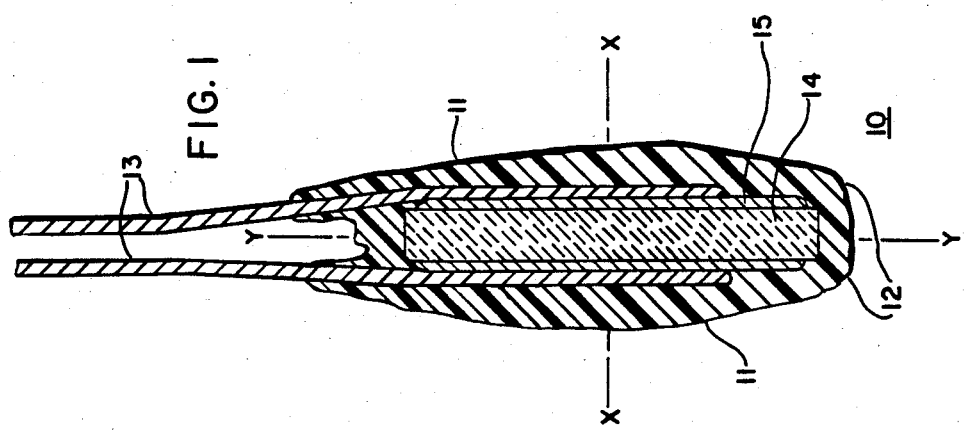

U.V. CURED FLEXIBLE POLYESTER-MONOACRYLATE PROTECTIVE THERMISTOR COATINGS HAVING GOOD EDGE COVERAGE AND METHOD OF COATING

BACKGROUND OF THE INVENTION

Thermally sensitive resistors, thermistors, are used in various electric circuits for measurement or detection of temperature changes, or for control of circuit operations in the presence of temperature changes. These thermistors are manufactured as small discs, usually 0.02 inch to 0.8 inch in diameter and 0.01 inch to 0.2 inch thick, from pressed and sintered metal oxide blends. The flat sides of these thermistor discs or wafers are generally coated with a thin electrode material, to which electrical conductors are attached by various means, followed by sealing the whole in an appropriate, protective coating material.

Nagata, in U.S. Pat. No. 3,820,239, sealed platinum lead connected, 0.04 inch diameter by 0.02 inch thick thermistors, with fused glass at about 800° C. Such a coating process provides an inflexible coating, requires platinum type leads, and could result in thermal shock, leaching and oxidation effects on the thermistor. Dankert, in U.S. Pat. No. 3,839,783, taught sealing copper lead connected 0.1 inch diameter by 0.03 inch thick thermistors with an aluminum oxide filled epoxy resin having shrinkage properties, which when cured, presumably at from about 100° C. to 250° C. over several hours, tightly held the contacts in place without a high temperature soldering step. This highly filled coating would still be rather inflexible, and require substantial heating of the assembled thermistor. In Dankert, thermistor wafers, held by spring tension of the leads, were dipped into an electrically insulating, thermally conducting liquid bath and then permitted to cure. Such a process could also allow substantial drainage of the liquid resin from the thermistor wafer edges before gellation and final cure. While several dip and cure cycles could be used, there is a need for a simple, low temperature, single cycle, inexpensive thermistor coating method, which would provide flexible encapsulation not subject to cracking or edge withdrawal.

Lucey, in U.S. Pat. No. 4,282,269, attempted to provide thick, low temperature curable coatings for tubular ceramics and various types of capacitors by using a specific, ultraviolet (U.V.) radiation curable resin system, selected from an acrylic urethane resin or a diacrylate ester of a bisphenol A epoxy resin, both containing either zinc borate, calcium metaborate or barium metaborate, and a photoinitiator, such as acetophenone. The epoxy formulation included a major amount of a nonvolatile diacrylate ester of a bisphenol A epoxy resin, minor amounts of 1,6-hexanediol diacrylate diluent, and photoinitiator, and up to 31 wt.% of zinc borate. The use of zinc borate allowed ultraviolet radiation cure times of from 10 seconds to 50 seconds and provided coatings generally from about 0.005 inch to 0.07 inch thick. The coating could be applied by spraying, painting, dipping or roll-coating, and then cured by passing the coated component under an ultraviolet type lamp on a conveyor system, with about an 11 second to 12 second radiation exposure time. Once initiated, the cure could continue in the dark. Such coatings were still not as flexible and crack resistant as desired nor did the method taught provide outstanding edge coverage of the coated component.

Photosensitive compostions have been widely used in other areas. Sattler et al., in U.S. Pat. No. 4,154,896, used polyester resin copolymerized with acrylic monomer, and containing U.V. photoinitiators, as insulating coating compositions for steel laminations of transformer and generator cores. Sattler et al. taught polyester compositions containing: (1) polyols selected from diols such as 1,2-propylene glycol or triols such as tris(2 hydroxyethyl)isocyanurate, (2) organic dibasic acids selected from both aliphatic dicarboxylic acids, such as maleic or fumaric acid or anhydride, and aromatic dicarboxylic acids, such as terephthalic or isophthalic acid or anhydride or dimethyl terephthalate acid ester, (3) ultraviolet radiation photoinitiator and (4) catalyst. This polyester was then copolymerized with from about 10 wt.% to about 60 wt.% of an acrylate monomer, preferably having at least two acrylic groups, such as hexanediol diacrylate; neopentyl glycol diacrylate; or trimethylol propane triacrylate, to provide fast curing, thermally stable, strong coatings. Simple monoacrylates, such as methyl acrylate or ethyl acrylate were not found useful. More complicated monoacrylates, such as 2-ethyl hexyl acrylate; 2-methoxy ethyl acrylate; or 2-phenoxy ethyl acrylate could be used up to 10 wt.% of the acrylate component. These compositions had good metal wetting properties and abrasion resistance, and provided pin hole free films about 0.0005 inch to 0.005 inch thick. The compositions were continuously coated with a roller, spray, or dip means, onto steel sheet and passed under ultraviolet radiation cure means at speeds of up to 400 ft./min.

SUMMARY OF THE INVENTION

The above problems have been solved and the above needs met by coating an electronic component with a photosensitive, ultraviolet radiation curable, liquid coating composition resin, axially rotating the component, and subjecting the coated component to ultraviolet (U.V.) radiation; to provide outstanding resin retention, crack resistance, flexibility and thermal stability after U.V. cure. This method has most application for thin disc or cylindrical components which have sharp edges, but it may also be useful for spherical components and the like.

The preferred liquid coating composition comprises a polyester (alkyl) component blended and copolymerized with a reactive monoacrylate. The polyester component contains polyol, preferably a triol such as a tris(2 hydroxy alkyl)isocyanurate; and organic dibasic acid, preferably a carbocyclic dicarboxylic acid, such as terephthalic acid or anhydride. The reactive monoacrylate has only one acrylic acid moiety or group. No polyacrylate monomers are used or desired. The coating composition will contain about 70 wt.% to about 90 wt.% polyester component and from 10 wt.% to about 30 wt.% monoacrylate.

With the proper photoinitiators, 100% solids resinous compositions can be formulated having low volatility, good pot life, and a viscosity of below about 2000 cps. at 25° C., that can cure quickly under ultraviolet radiation to form a flexible, crack resistant, pin hole free, high temperature stable film, having thickness of from about 0.002 inch to about 0.08 inch, particularly suitable as protective coverings for disc shaped electronic components, such as disc shaped thermistors. To insure minimal resin dripping and maximum edge coverage, the coated, disc shaped electronic component can be axially rotated from its resin coating position, at an angle effective to control or reverse resin flow or dripping, preferably by 180° inversion about its vertical axis prior to or during ultraviolet radiation curing.

BRIEF DESCRIPTION OF THE DRAWING

For a better understanding of the invention, reference may be made to embodiments exemplary of the invention, shown in the accompanying drawings, in which:

FIG. 1 shows a sectional view of a protective coated, disc shaped thermistor with attached leads; and FIG. 2 shows one means of curing coated thermistors according to the rotational method of this invention, using a resin bath to apply resin.

DESCRIPTION OF THE PREFERRED EMBODIMENTS

Useful coating compositions for application as disc shaped thermistor encapsulants should provide particularly good edge coverage, high temperature stability, and outstanding flexibility—providing resistance to cracking upon extended thermal cycling. These compositions preferably comprise: (1) from about 70 wt.% to about 90 wt.% of a polyester (alkyl) component comprising (a) polyol selected from diols, such as 1-3-propane diol; 1,4-butane diol; 1,2-butane diol, and the like, and their mixtures, and preferably, triols, such as tris(2 hydroxy alkyl)isocyanurate, where alkyl is preferably ethyl; glycerine; pentaerythritol; inositol; trimethylol propane; trimethylol ethane; sorbitol, and the like, and their mixtures, and (b) an organic dibasic acid, preferably a carbocyclic dicarboxylic acid, such as phthalic acid, isophthalic acid, terephthalic acid or tetrahydrophthalic acid, the first three being aromatic acids, their anhydrides, and their mixtures, where the term "acid" is herein meant to include acid anhydrides. Preferably, no aliphatic dicarboxylic acids, such as maleic acid, fumaric acid or other anhydrides will be used, because they would tend to cause additional copolymerization with the monoacrylate, reducing flexibility, however, up to about 20 wt.% of the dibasic acid can constitute aliphatic dicarboxylic acid types; (2) from 10 wt.% to abou 30 wt.% of a monoacrylate, such as methyl acrylate; ethyl acrylate; 2-ethyl hexyl acrylate; 2-hydroxy ethyl acrylate; 2-methoxy ethyl acrylate; 2-ethoxy ethyl acrylate; 2-phenoxy ethyl acrylate; and the like, and (3) an effective amount of ultraviolet radiation photoinitator. Useful weight ratios of (polyol):-(dibasic acid) for the polyester range from about (2):(1) to about (5):(1). Excellent results have been obtained with reacted tris(2 hydroxy ethyl)isocyanurate and terephthalic acid, blended with 2-phenoxy ethyl acrylate. Acrylates having two or more acrylic groups are excluded, tending to reduce flexibility of the cured coating composition.

Photoinitiators must be added in amounts effective to initiate and complete polymerization with ultraviolet light exposure, to a complete cure without heat. Typical photoinitiators well known in the art would include, for example, benzophenone; diethoxyacetophenone; 2,2 dimethoxy-2 phenylacetophenone; benzoin methyl ether; benzoin ethyl ether; benzoin isopropyl ether; benzoin isobuty ether; chlorothio-xanthanone; azo-bis-isobutyronitrile, their mixtures, mixtures of N-methyl diethanolaminebenzophenone and the like. They may be used at about 1 part to about 10 parts, preferably about 2 parts to 5 parts per 100 parts of the coating composition (polyester and monoacrylic monomer components). The resulting coating composition will have a viscosity of from about 50 cps. to 2,000 cps. and preferably about 100 cps. to 900 cps. at 25° C. In addition, catalysts, such as amines, for example, phenylenediamine; benzyldimethyl amine; methylbenzyldimethylamine; dimethylaminomethylphenol, and the like may be used in amounts effective to promote the photoinitiation mechanism, generally about 0.05 part to about 1.0 part per 100 parts of the composition.

It has been found useful to add anti-sag or thixotropic agents, such as fumed silica having particle sizes of from about 0.007 micron to about 0.02 micron, and surface areas of from about 200 m$^2$/gram to about 400 m$^2$/gram. Bentonite, a colloidal aluminum silicate clay is also useful. Other thixotropic agents which are well known in the art, such as carbonates, silicates and sulfates of alkaline earth metals, reactive metal oxides, such as MgO, and the like, should also be useful. These materials contribute to flow control and help achieve good edge coverage. They may be used in effective amounts of from about 0.1 part to about 5 parts, preferably from about 0.2 part to about 1 part per 100 parts of the coating composition (polyester and monocrylic monomer components).

Surfactants may optionally also be added to the coating composition to enhance surface tension effects and promote surface leveling and good adhesion of the coating composition to the electronic component. The surfactant has the property of lowering the surface energy of the resin in which it is used so that the surfactant can migrate to the interface between the resin and electronic component. They may be used in effective amounts of from about 0.2 part to about 1 part per 100 parts of the coating composition. One preferred fluorochemical surfactant has a perfluorinated chain attached to an alkoxylate group,

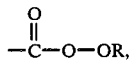

i.e. a fluorinated alkyl alkoxylate. Other suitable surfactants may have a perfluorinated chain at least 3 carbon atoms long at one end and a sulfur containing polar group at the other end. A general formula for these latter surfactants is:

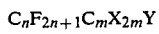

where X is H, F, Cl, Br or their mixtures and m+n is an integer from 3 to about 18. The polar group Y, can include groups such as

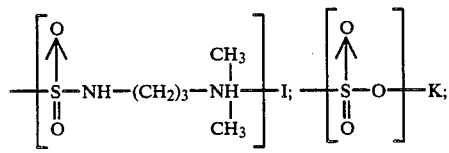

and the like. Of course any other useful surfactant can be substituted. Such surfactants are described in detail in U.S. Pat. No. 3,925,297, herein incorporated by reference.

The preparation of the photosensitive coating composition generally comprises addition of the primary ingredients, except the monoacrylate monomer and photosensitizer which are generally added last, by blending at a temperature of between about 150° C. to about 240° C., until the reaction proceeds to an acid number of from about 5 to 25. The reaction product comprising the polyester component is then cooled below about 120° C. The polyester component is then dissolved in the reactive monomer. This provides a coating composition having a pot life in dark storage or in a closed container of from about 4 weeks to eighteen months at 25° C. This composition wets metal very well and will coat easily onto metal substrates.

Upon ultraviolet radiation curing, by, for example using a bank of light sources, the composition will completely cure, even in a continuous operation, at 25° C. No further heating is required, although post baking at from about 120° C. to about 175° C. is optional. When cured the composition will have a temperature capability of between 135° C. and 180° C.

Referring now to FIG. 1 of the Drawings, an electronic component having edges thereon, such as a coated, disc shaped electronic component, for example thermistor 10 is shown. Cured coating composition 11, having good edge definition at 12 around the circumference of the disc, is shown encapsulating the disc. Lead wires 13, which may be thin copper, platinum, or the like wires, are shown attached to the disc. These wires are shown substantially parallel to each other and to the flat surface of the disc, and extending from the protective coated disc. Vertical axis Y—Y is shown, as well as horizontal or lateral axis X—X. The lead wires may cross each other in the vertical plane providing a spring action for holding the thermistor 14, as described in U.S. Pat. No. 3,839,783. The thermistor itself 14, can be made of combinations of mixed, pressed, sintered metal oxides, with conductive electrode material 15 disposed on opposite flat surfaces of the wafer, as is well known in the art, as shown, for example in U.S. Pat. Nos. 3,820,239 and 3,839,783. Other electronic components having edges that can be coated according to the method of this invention include pellet capacitors, and the like. The electronic component when in disc form will generally be from about 0.02 inch to 0.8 inch in diameter by 0.01 inch to 0.2 inch thick. The coating thickness will generally be from about 0.002 inch to 0.08 inch thick, depending on the dimensions of the disc. Of course larger cylindrical electric components having sharp edges can also be coated.

In one method of this invention, shown in FIG. 2 of the Drawings, the disc or cylindrical electronic component to be coated, 20, would have its substantially parallel leads 13 attached by any suitable means to an overhead, rotatable, continuous transfer means section 21. The transfer means section would be moved by any suitable means in the direction of arrow 22 in such a fashion that the electronic component 20 would be dipped into bath 23 containing the liquid, photosensitive, coating composition 24 of this invention, with the leads extending upward and supporting the electronic component. The composition 24 would completely coat the disc or cylindrical electronic component and any section of the attached leads 13 also dipped into the composition. The coated electronic component would emerge from the bath 23 and proceed to the bank of U.V. lights 25. As soon as the electronic component emerges from the bath, the composition would necessarily begin to gravitationally flow downward along the vertical axis Y—Y, with a resulting withdrawal from the edges at the top of the electronic component.

At point 26, the coated electronic component would be rotated, preferably up to 180° about its vertical axis; to an angle effective to control dripping by means of the rotatable transfer means section to which it is attached. This rotation would most preferably be from the downward position of coated component shown as 27 to the upward position of coated component shown as 28, i.e., 180° rotation, thereby reversing the vertical flow of the composition just before or while the photosensitive composition is exposed to ultraviolet radiation from the bank of ultraviolet type lights 25. It is possible however, with a circular array of U.V. sources, to rotate the component through 360°.

With proper timing between emergence of the coated electronic component, up to 180° inversion, and passage next to a source of ultraviolet radiation, along with use of a good edge coverage coating composition, no component edge will be exposed, even using thin, one pass coverage. Usually, a 1 second ultraviolet radiation exposure will be sufficient to cause gellation of the coating composition, and a 10 second ultraviolet radiation exposure will usually be sufficient to completely cure the coating composition. Travel rate under the ultraviolet radiation light bank 25 should be sufficient for a 10 second to 15 second exposure of the photosensitive coating to the ultraviolet radiation. After cure, the coated electronic components can be detached from their transfer means, or optionally, passed through or placed in a heating oven, not shown, for 2 minutes to 10 minutes at about 150° C. The resin bath dip method of FIG. 2 is preferred, but other suitable resin application methods may also be used.

EXAMPLE 1

A Sample A, photosensitive polyester-monoacrylate coating composition was made. A reaction flask equipped with stirred and thermometer was filled with 130.6 grams of tris-(2 hydroxy ethyl)isocyanurate; 41.5 grams of terephthalic acid; and 2.1 grams of deionized water used to initiate the condensation reaction. The ingredients were heated rapidly to about 185° C. and then slowly to 215° C. and held at about 215° C. for approximately 1 hour, until an acid number of 16 was reached. This polyester component was then cooled to about 90° C. and dissolved in a monoacrylate component. For 100 parts by weight of polyester, the monoacrylate component consisted of: 25 parts of phenoxy ethyl mono acrylate; 5 parts of 2,2 dimethoxy-2 phenylacetophenone photoinitiator; and 0.25 part of benzyldimethylamine catalyst for the photoinitiation reaction. The polyester was first dissolved in the monoacrylate, and then the photoinitiator and catalyst were added. The coating composition contained 76.7 wt.% polyester and had a viscosity at 25° C. of about 650 cps.

A Sample B, polyester-monoacrylate coating composition was also made, by adding to 100 parts by weight of the Sample A composition: 0.3 part of fumed silica thixotropic agent, and 0.3 part of a fluorinated alkyl alkoxylate surfactant. The Sample B coating composition contained 76.5 wt.% polyester and had a viscosity at 25° C. of about 750 cps.

Thermistors, 0.5 inch in diameter and 0.125 inch thick, having two substantially parallel conducting lead wires extending outward, were attached to a support by taping the lead wires to the support. The thermistor bodies were then turned so that the leads were facing upward with the discs facing downward. The discs were then dipped in a resin bath of each of the Sample compositions at 25° C., as is shown in FIG. 2 of the drawings, except that this was a batch process. Using the Sample A coating composition, in one instance, the thermistors were taken from the bath disc facing down and placed under a U.V. lamp for 10 seconds without inverting the coated thermistor disc; in another instance, using the Sample A composition, dipping −10 second disc down U.V. steps were repeated once without inverting the coated thermistor, followed by heating at 150° C. Using the sample B coating composition, the thermistor was heated for 10 minutes at 80° C. and then cycled through four dipping −6 second disc down U.V. curing steps.

The same coating operating for each of the Samples was then followed as above, but now the coated thermistors were inverted, turned around 180°, so that the lead wires faced downward and the discs faced upward under the U.V. lights, as shown at the end of FIG. 2 in the Drawings. This 180° inversion about the vertical axis allowed the coating composition to flow back to its initial position just after the bath dip coating step, at the instant it was subjected to U.V. radiation.

Continuous Electrical Cycling Tests were then run: 5 minutes at 120 volts between the leads, followed by 5 minutes with the current off. This cycling very rapidly heated the thermistor to about 150° C., causing expansion of the various parts. The results are shown in Table 1 hereinafter.

COMPARATIVE EXAMPLE

Sample C, D and E coating compositions were also subjected to the electrical cycling tests described in EXAMPLE 1. The Sample C coating resin was a 100% solids, solventless, U.V. curable epoxy resin, having a viscosity of 700 cps. 25° C., and a 116° C. flash point. The Sample D coating resin was a 100% solids, solventless, U.V. curable, high flash point epoxy resin, having a viscosity of 1180 cps. at 25° C., and a 175° C. flash point. The Sample E coating was a reacted admixture of 50 parts by weight of acrylated aliphatic urethane; 50 parts of tripropylene-glycol diacrylate; 5 parts of 2,2 dimethoxy-2 phenyl acetophenone; and 3 parts of dimethylaminoethanol. The thermistors were dipped in the Sample C, D, and E coating compositions as described in EXAMPLE 1, with a single dip and a 10 second U.V. cure, without inverting the coated thermistor. The results of the Electrical Cycling Tests are shown in Table 1 following.

Coating requirements for all the thermistors tested were 500 volts from thermistor to ground, complete edge coverage, maximum continuous operating temperature of about 180° C., coating thickness of from 0.005 inch to 0.02 inch, and at least 15 days of continuous electrical cycling between 0 and 120 volts.

TABLE 1

| Sample | U.V. Curable Coating Type | No. Dips | Coating Thickness Inch | Total U.V. Time | Rotation | Electrical Cycle Days To Fail* | Edge Coverage |
|---|---|---|---|---|---|---|---|
| A | polyester-monoacrylate | 1 | 0.005 | 10 sec | no | 19 | poor |
| A | polyester-monoacrylate | 2 | 0.010 | 20 sec + 10 min at 150° C. | no | 90 | poor |
| A | polyester-monoacrylate | 1 | 0.005 | 10 sec | yes: 180° | 19 | very good |
| A | polyester-monoacrylate | 2 | 0.010 | 20 sec + 10 min at 150° C. | yes: 180° | 90 | very good |
| B | polyester-monoacrylate incl. surfactant & thixotrope | 4 | 0.020 | 10 min at 180° C. + 24 sec U.V. | no | 20 | poor |
| B | polyester-monoacrylate incl. surfactant & thixotrope | 4 | 0.020 | 10 min at 180° C. + 24 sec U.V. | yes: 180° | 20 | excellent |
| C** | epoxy | 1 | 0.005 | 10 sec | no | 6 | — |
| D** | epoxy | 1 | 0.005 | 10 sec | no | 1 | — |
| E** | urethane-diacrylate | 1 | 0.005 | 10 sec | no | 3 | — |

*Cycle = 5 minutes at 120 volts between leads and 5 minutes off.
**Comparative Examples As can be seen from Table 1, all the polyestermonoacrylate Samples A and B passed the Electrical Cycle Test Minimum of 15 days, indicating good high temperature stability and flexibility in the cured coating. When the coating process included inversion, allowing resin flowback, all of Samples A and B passed edge coverage tests. Particularly good results were achieved with a short post bake at 150° C. and inclusion of surfactant and thixotrope. None of the comparative Samples C, D and E even came close to passing the Electrical Cycle Test, and so were not inverted to test optimum edge coverage. Single or multiple dip Samples A and B, with or without a short post bake, when U.V. cured after 180° inversion from their bath position, provided excellent, flexible thermistor coatings, having good edge coverage, high heat stability, and excellent electrical properties. The method shown in FIG. 2 of the Drawings is capable of fast coating with minimum step commercial utilization.

I claim:

1. A method of curing coated electronic components, where the coating is subject to withdrawal after application, comprising the steps:
   (A) placing an electronic component in a bath containing an ultraviolet radiation curable, liquid coating composition resin comprising a monoacrylate and a photoinitiator, to completely coat the electronic component;
   (B) removing the coated electronic component from the resin bath, necessarily causing a downward flow of the applied resin;

(C) rotating the coated electronic component from its bath position to control the flow of resin resulting from removal from the bath; and (D) passing the rotated electronic component next to a source of ultraviolet radiation.

2. The method of claim 1, where the electronic component is a thermistor disc having edges thereon, thermistor disc is rotated in step (C) up to 180° from its bath position to reverse the flow of resin resulting from its removal from the bath.

3. The method of claim 1, where the coating composition is a polyester-monoacrylate, and as a last step, the coated electronic component is heated.

4. The method of claim 3, where the coating composition consists essentially of:
(1) from about 70 wt.% to about 90 wt.% of a polyester component consisting essentially of:
  (a) polyol selected from the group consisting of diols and triols and mixtures thereof; and
  (b) organic dibasic acid, and
(2) from about 10 wt.% to about 30 wt.% of a monoacrylate, and
(3) an effective amount of photoinitiator.

5. A method of curing protective coated electronic components having edges thereon, where the coating is subject to withdrawal from the edges after application, comprising the steps:
(A) passing an electronic component having edges thereon through a bath containing an ultraviolet curable, liquid, polyester-monoacrylate coating composition containing photoinitiator, to completely coat the electronic component;

(B) removing the coated electronic component from the resin bath, necessarily causing a downward flow of the applied resin with resulting resin withdrawal from the edges at the top of the electronic component;

(C) rotating the coated electronic component to control the flow of resin resulting from removal from the bath; and (D) passing the rotated electronic component next to a source of ultraviolet radiation.

6. The method of claim 5 where the electronic component is a thermistor disc and the thermistor disc has electrical leads attached thereto, said leads being substantially parallel to each other and to the vertical axis of the disc as it passes through the coating bath, and the coated thermistor is rotated in step (C) up to 180° from its bath position to reverse the flow of resin.

7. The method of claim 5, where the polyester-monoacrylate also contains a thixotropic agent and a surfactant, and as a last step, the coated electronic component is heated.

8. The method of claim 7, where the polyester-monoacrylate coating composition consists essentially of:
(1) from about 70 wt.% to about 90 wt.% of a polyester component consisting essentially of:
  (a) polyol selected from the group consisting of diols and triols and mixtures thereof; and
  (b) organic dibasic acid, and
(2) from about 10 wt.% to about 30 wt.% of a monoacrylate, and
(3) an effective amount of photoinitiator.

* * * * *